Oct. 12, 1965

V. O. FOSSE ETAL 3,211,073

AUTOMATIC PHOTOPRINTING APPARATUS

Filed Jan. 15, 1962

INVENTORS
VERNELL O. FOSSE
STANLEY T. STOOTHOFF
WILLIAM W. STOOTHOFF
BY *Carpenter Abbott Coulter & Kinney*
ATTORNEYS

INVENTORS
VERNELL O. FOSSE
STANLEY T. STOOTHOFF
WILLIAM W. STOOTHOFF
ATTORNEYS

Oct. 12, 1965    V. O. FOSSE ETAL    3,211,073
AUTOMATIC PHOTOPRINTING APPARATUS
Filed Jan. 15, 1962    10 Sheets-Sheet 3

INVENTORS
VERNELL O. FOSSE
STANLEY T. STOOTHOFF
WILLIAM W. STOOTHOFF
BY Carpenter Abbott Coulter & Kinney
ATTORNEYS Oct. 12, 1965

V. O. FOSSE ETAL 3,211,073

AUTOMATIC PHOTOPRINTING APPARATUS

Filed Jan. 15, 1962

INVENTORS
VERNELL O. FOSSE
STANLEY T. STOOTHOFF
WILLIAM W. STOOTHOFF
BY *Carpenter Abbott Coulter & Kinney*
ATTORNEYS Oct. 12, 1965  V. O. FOSSE ETAL  3,211,073
AUTOMATIC PHOTOPRINTING APPARATUS
Filed Jan. 15, 1962  10 Sheets-Sheet 6

INVENTORS
VERNELL O. FOSSE
STANLEY T. STOOTHOFF
WILLIAM W. STOOTHOFF
BY
Carpenter Abbott Coulter & Kinney
ATTORNEYS

INVENTORS
VERNELL O. FOSSE
STANLEY T. STOOTHOFF
WILLIAM W. STOOTHOFF
ATTORNEYS

INVENTORS
VERNELL O. FOSSE
STANLEY T. STOOTHOFF
WILLIAM W. STOOTHOFF
BY Carpenter Abbott
Coulter & Kinney
ATTORNEYS Oct. 12, 1965  V. O. FOSSE ETAL  3,211,073
AUTOMATIC PHOTOPRINTING APPARATUS
Filed Jan. 15, 1962  10 Sheets-Sheet 10

INVENTORS
VERNELL O. FOSSE
STANLEY T. STOOTHOFF
WILLIAM W. STOOTHOFF
BY Carpenter Abbott Coulter & Kinney
ATTORNEYS United States Patent Office 3,211,073
Patented Oct. 12, 1965

3,211,073
AUTOMATIC PHOTOPRINTING APPARATUS
Vernell O. Fosse, Mahtomedi, Minn., and Stanley T. Stoothoff, Glenrock, and William W. Stoothoff, Ramsey, N.J., assignors to Minnesota Mining and Manufacturing Company, St. Paul, Minn., a corporation of Delaware
Filed Jan. 15, 1962, Ser. No. 166,147
8 Claims. (Cl. 95—73)

This invention relates to an improved apparatus for photographically reproducing film sections, such as sections of microfilm mounted in aperture cards.

One of the objects of the present invention is to provide an improved automatic photoprinting apparatus having novel means for conveying original or master film sections and unexposed film sections, in accurate registry, past a photoprinter.

Another object of the invention is to provide an improved photoprinting apparatus of the class described which is characterized by compactness and simplicity of construction by virtue of the novel horizontal exposure unit and novel conveying means embodied therein.

Yet another object of the invention lies in the provision, in apparatus of the character indicated, of a series of novel card-supporting structures or exposure "pockets" on the conveyor for holding the film sections in proper registry during the printing of the duplicate film section as the pocket traverses the exposure unit, there also being provided novel means for loading the cards into as well as for removing the cards from said pockets in timed relation to the travel of said pockets.

Still another object is to provide, in apparatus of the aforementioned character, novel means for separating the cards following removal from the pockets, for conveying the original to a first stack, and for conveying the duplicate through a novel developing chamber and thence to a second stack.

Still another object of the present invention is to provide in apparatus as aforesaid, an improved developing chamber structure which is highly efficient, not only in producing developed film sections free from haze and moisture, but also in the conservation of developing materials.

Still another object of the present invention is to provide an improved apparatus for automatic, high-speed duplication of film sections supported in aperture cards of the statistical or tabulating machine type onto diazo film sections supported in similar aperture cards.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views, FIGURE 1 is a side elevation of one form of automatic photoprinting apparatus constructed in accordance with the present invention, certain of the parts being shown in section and certain parts located interiorly being shown in phantom lines;

Figure 1:
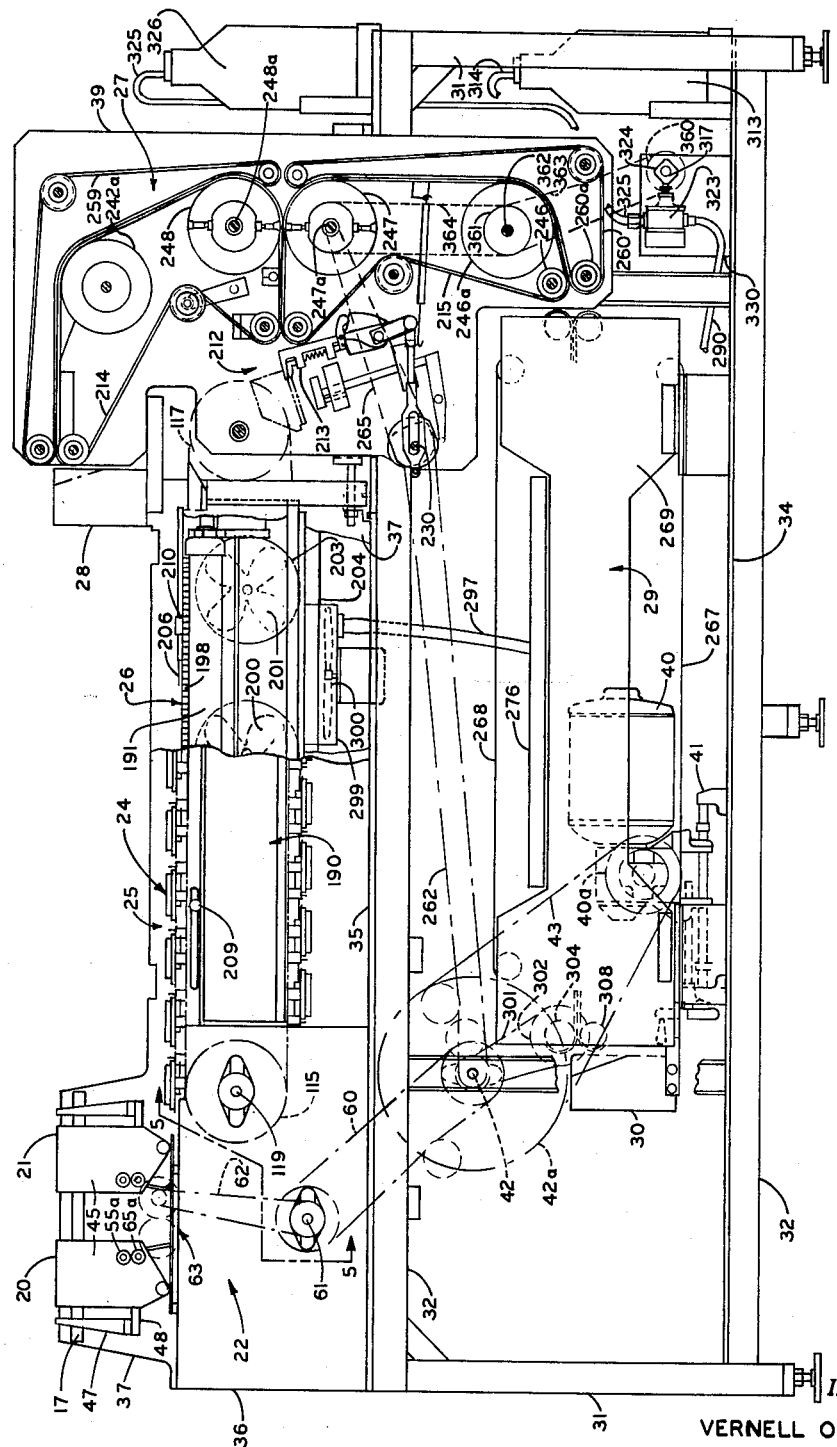

Referring now to the drawing, there is shown by way of example one form of apparatus constructed in accordance with the present invention. Such apparatus, as will be more readily understood upon consideration of FIGURES 1 and 12, includes means for storing a set of master or original film sections and a set of duplicate similar film sections, means for feeding a single section from each set into a receiving bin, in superimposed relation, and means for feeding the pair of film sections onto a conveyor for traverse across a photoprinter. Means is also provided for removing the film sections from the conveyor after exposure at the photoprinter and for separating the original film section from the duplicate film section. The original film sections are then conveyed to one stack, and the duplicate film sections are directed to and through a developer, after which said duplicate film sections are conveyed to another separate stack. The illustrated film sections take the form of inserts in apertured cards of the record type commonly employed in connection with know and existing record card tabulating and sorting systems and machines, the film sections being frames of microfilm mounted in the apertures of the cards. It will be understood, however, that the present invention is not limited to the printing and developing of film sections mounted in cards of the statistical or tabulating machine type, since other forms of record or catalog cards, as well as ordinary cards, may be used for this purpose. Additionally, apparatus in accordance with the present invention may be used to advantage in the printing and developing of various other types of film sections, including film sections which are not mounted in cards or similar supporting structures.

For purposes of illustration only, there are shown in the drawings master and duplicate cards, designated 11 and 14, respectively, which are of the statistical or tabulating machine type. Such cards are shown as having rectangular apertures 12 and 15, respectively. A section of developed microfilm, hereinafter termed the master or original film section 13, is mounted in the aperture 12 of master card 11. A film section is similarly mounted in the aperture 15 of duplicate card 14, such film section being designated 16 at the start of the operations schematically depicted in FIGURE 12, at which time it is in a sensitized but unprinted and undeveloped state. After the film section 16 has been printed and developed by passage through the improved apparatus, said film section is designated by the numeral 16′.

Master cards 11 and duplicate cards 14 are identical as to the size and placement of the film-section bearing apertures therein, the apertures being located adjacent one end of the card. It is obvious that to properly duplicate film section 13 upon section 16, the master and duplicate cards must be superimposed in accurate registry and must be maintained firmly in contact with each other without motion relative to each other during their travel past the photo-printer or exposure unit of the apparatus. Prior apparatus has been prone to operational difficulties because of failure to properly clamp or press the cards together immediately upon being placed in or on the conveyor. In the improved apparatus the film sections are placed in a superimposed relation before being placed on the conveyor, and when placed on the conveyor are received by exposure "pockets" and immediately clamped in proper registry to remain thus clamped as they traverse the exposure unit.

GENERAL DESCRIPTION OF THE APPARATUS

Figure 12:
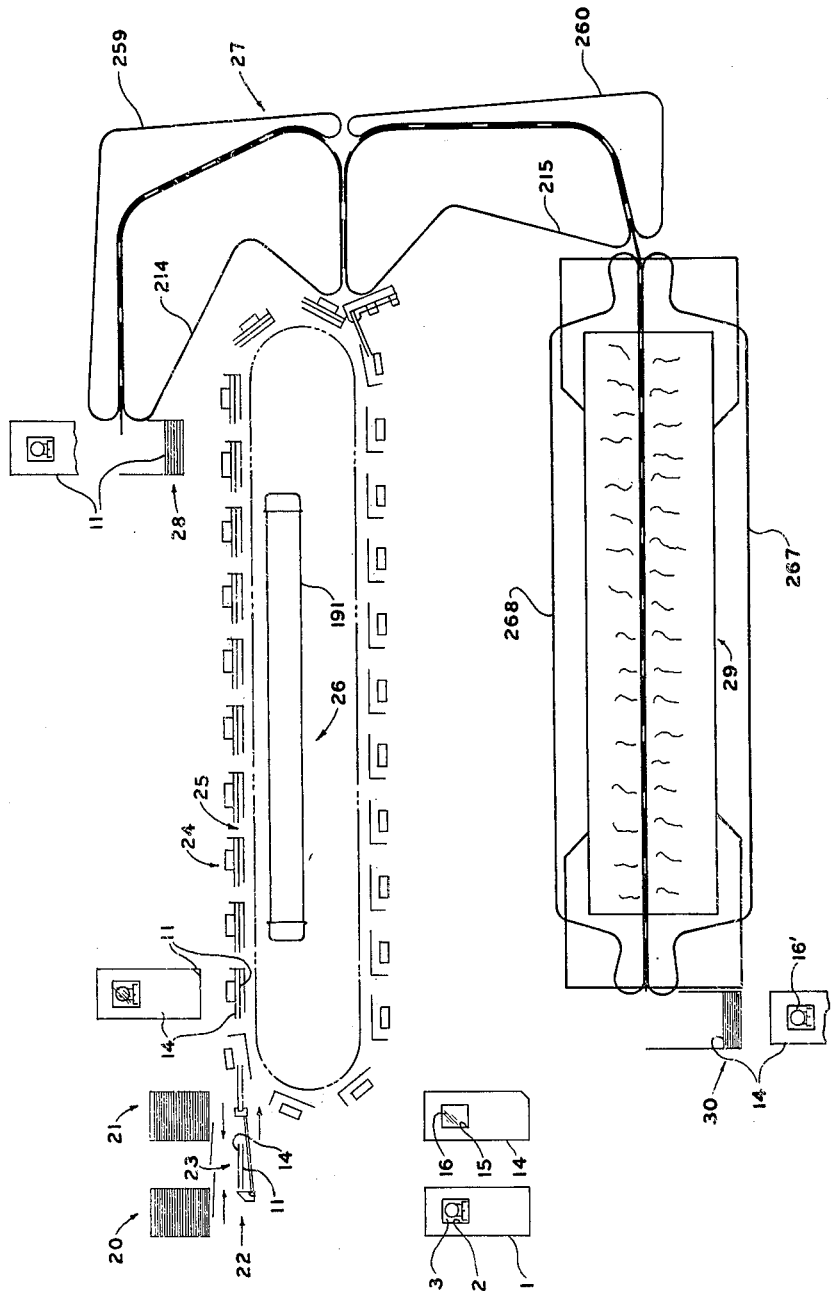
FIGURE 12 is a schematic view in the nature of a flow-sheet indicating the successive steps performed by the apparatus.

The general characteristics of the apparatus of the invention will be understood by a consideration of FIGURES 1 and 12. A supply of master cards 11 are stored in a suitable receptacle or file 20 and a supply of duplicate cards 14 are stored in a separate receptacle or file 21. A single original card 11 is fed from the receptacle 20 and a single duplicate card is fed from the receptacle 21 by a card feeder mechanism generally designated 22, which deposits the fed cards in superimposed relation in a receiving bin 23. The superimposed cards are then guided into one of a series of card-receiving exposure pockets 24 carried by and comprising part of the conveyor 25 which carries the cards across an exposure unit 26. After crossing the exposure unit 26, the card pockets 24 are inverted, and the cards are removed therefrom by a suitable removing and separating mechanism generally designated 27. The mechanism 27 also conveys the original card to a stacker 28 and conveys the duplicate card to a developing unit 29. The developing unit develops the duplicate member and places it in the container or stacker 30.

The embodiment of the apparatus shown includes control elements which control the operation of the machine and shuts down the feeding mechanism when more than or less than the proper number of cards are fed into the pockets of the conveyor. This detecting system prevents the waste of the duplicate cards and acts in another capacity to shut down the machine when the desired number of original cards have been duplicated.

DETAILED DESCRIPTION OF THE APPARATUS

Turning now to a detailed description of the disclosed apparatus in accordance with the invention, such apparatus has a supporting structure generally in the form of a double-decked table having a plurality of upright frame members 31 connected by a plurality of longitudinally and transversely extending frame members 32. The frame members support a lower horizontal platform or deck member 34, an upper deck member 35 and a plurality of upright parallel longitudinal plate like members 17, 36, 37, 38 and 39 shown most clearly in FIGURE 2. The aforementioned upright plates provide support for bearings in which a plurality of transverse shafts are journalled as will hereinafter appear. The various frame and plate members are suitably secured together in a manner well known in the art to provide a rigid structure.

Figure 2:
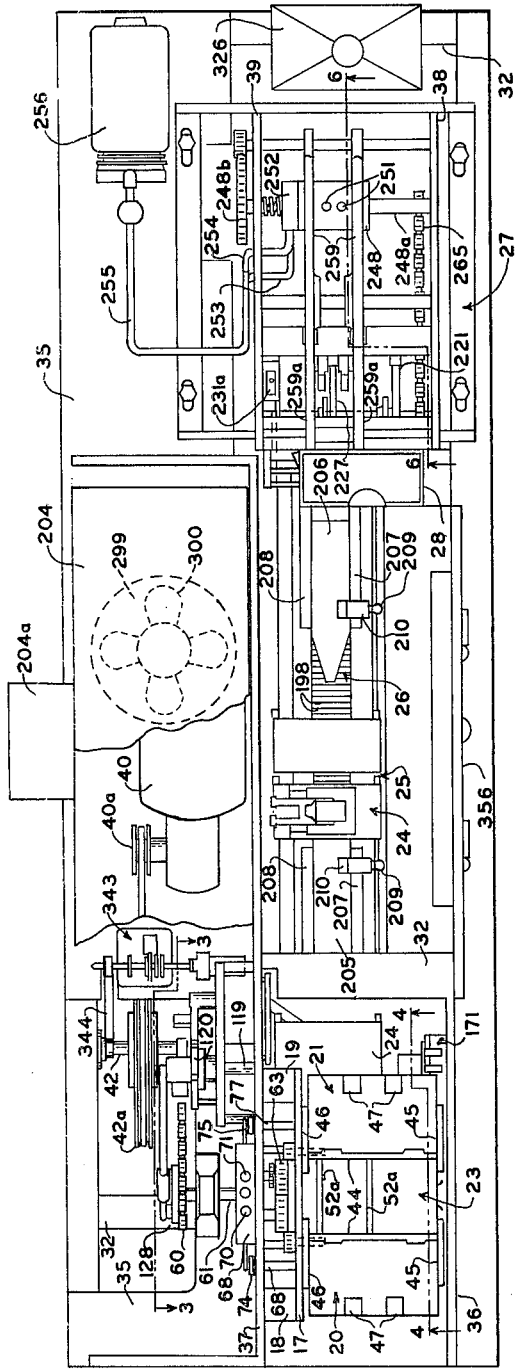
FIGURE 2 is a plan view of the apparatus with certain parts being removed, broken away or shown in phantom lines for the purpose of clarity.

As shown in FIGURE 1, the source of motive power for the illustrated apparatus is a motor 40 which is mounted on a suitable adjustable support designated 41 and carried by the deck 34. As shown in FIGURES 1 and 2, the motor 40 has a drive pulley 40a. A first main shaft 42 carries the pulley 42a fixed thereon, and the V-belt 43 entrained over pulleys 40a and 42a supplies power from the motor 40 to the shaft 42 for transmission to the various other driven components of the apparatus as will hereinafter appear.

*The card feeder*

The card feeder mechanism 22 functions to place a single card from each of the storage areas or files 20 and 21 in superimposed relation in a card-receiving bin 23 and to guide the superimposed cards onto the conveyor 22.

Figure 4:
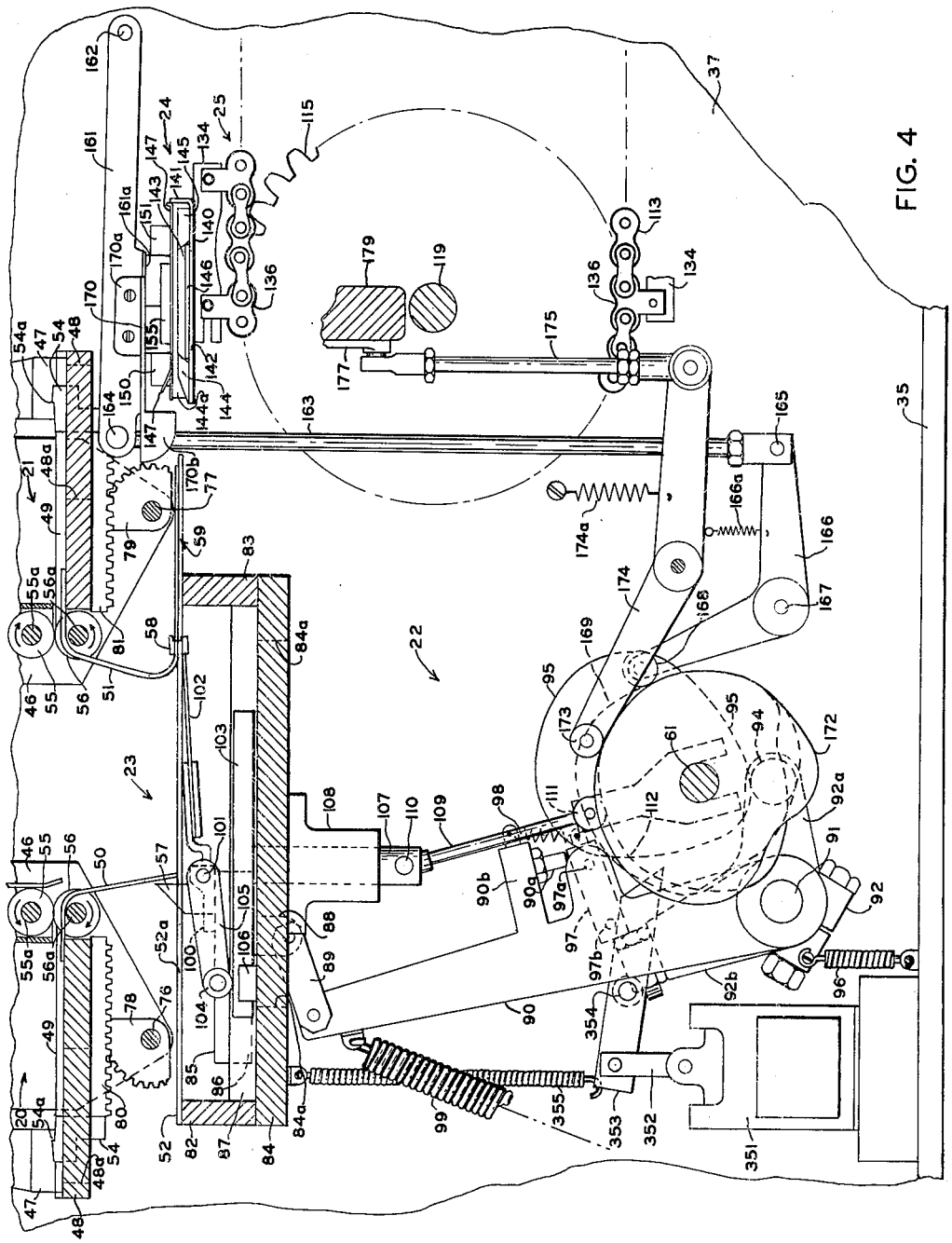
FIGURE 4 is an enlarged fragmentary view in vertical section taken along the line 4—4 of FIGURE 2, certain of the parts being shown in side elevation.

The storage files 20 and 21 are positioned between the longitudinal plates 36 and 37 on the left hand side of the apparatus as viewed in FIGURE 2, said files being supported by plate 17 which is fixed to the plate 37 by blocks 18 and 19. The card files are similar in structure and like parts carry like reference numerals. The files comprise a vertical side wall 44 suitably secured to end walls 45 and 46. The other side of the files is open, and a pair of spaced vertical posts 47 are disposed therein to retain the stored cards within the files. The posts 47, together with the open top of the files 20 and 21, allow easy manual insertion and removal of the cards from the files. The posts 47 are secured at the lower end thereof to bottom plates 48 having the upper surface thereof formed with spaced ribs 49 as shown in FIGURE 4.

Thin-gauge plate members 50 and 51 have oppositely directed horizontally extending upper end portions which are slotted to provide a plurality of fingers which overlie the plates 48 between the ribs 49 thereon and which also extend beneath the vertical side walls 44. The plate members 50 and 51 have portions which converge downwardly and form side walls for the receiving bin 23. A horizontal plate member 52 forms the bottom of the bin 23 and extends beneath the files 20 and 21. The plate 52 is supported on a pair of spaced transverse bars 82 and 83 disposed along the upper edge portions of a main support plate 84 which, in turn, is suitably secured between the vertical plates 36 and 37. The thin plate member 51 is substantially U-shaped, having its lower end portion bent to lie in horizontal superimposed relationship with the plate 52 to provide therebetween an outlet from the bin 23 defining a loading station 59 as will hereinafter appear. One end wall of the receiving bin 23 is formed by a plate member 53, shown in FIGURE 11, which has an opening 53a therein providing access for manual removal of cards from the bin when necessary or desired.

The card feeder mechanism 22 comprises reciprocating lug members 54 which travel in suitable slots formed in the bottom plates 48 of the files 20 and 21; counter-rotating feed rollers 55 and 56 positioned beneath the side walls 44 of the files for feeding cards from the files 20 and 21 to the receiving bin 23; and reciprocating guide or pusher members 57 and 58 which respectively direct the cards from the receiving bin to the waiting or loading sttaion 59 and then from said loading station in to the conveyor pocket 24.

Suitable drive means are provided for the aforementioned rollers, lugs and guides of the card feeder mechanism 22. Referring to FIGURE 1, the illustrated drive means comprises a main feeder drive shaft 61 (see also FIGURES 2 to 5) powered by a suitable chain 60 entrained around suitable sprockets carried respectively on the main shaft 42 and shaft 61. The shaft 61 extends through the vertical plates 36 and 37 and is suitably journalled on conventional bearings.

The feed rollers 55 and 56 are fixed to shafts 55a and 56a journalled in suitable bearings carried by the files 20 and 21, said shafts 55a being journalled to allow slight vertical movement. The shafts 55a and 56a are driven by a suitable belt or chain 62 from the shaft 61 through the medium of a gear train 63. The gear train 63, as shown in FIGURE 1, drives the shafts 56a carrying the rollers 56 and suitable gears on said shafts intermesh with gears on the shafts 55a to drive the rollers 55. The gear train 63 is associated and arranged with respect to the shafts 56a to drive the feed rollers 55 and 56 in the directions indicated by the arrows in FIGURE 4. The axes of the feed rollers 56 are positioned below and offset slightly to the left as viewed in FIGURE 4, from the axes of the rollers 55 associated therewith respectively. With the feed rollers 55 and 56 arranged in this manner, a card 11 being fed from the file 20 is directed at an angle downwardly into the receiving bin 23, whereas a card 14 being fed from the file 21 is directed at an angle slightly upwardly as it enters the bin 23 to thereby insure positioning of the card from the file 20 below the card from the file 21 in the receiving bin and also to prevent interference of said cards with each other as they are simultaneously inserted into the bin 23.

The bottom card in the stack in each of the files 20 and 21 is fed to the feed rollers of the respective files by the horizontally reciprocating lugs 54 associated with said files, each of said lugs being formed with a card-engaging shoulder portion 54a projecting above the plane of the upper surface of the ribs 49 on which said cards are stacked an amount not greater than the thickness of one card. The base plates 48 are formed with slots 48a to accommodate the reciprocating lugs 54. There are two spaced lugs 54 associated with each of the files 20 and 21, and said lugs are respectively carried by horizontally reciprocating slide bars 80 and 81 which are mounted in suitable bearings or slide ways (not shown) mounted on the under side of the base plates 48 of the files.

The under side of each of the slide bars 80 and 81 takes the form of a rack, and reciprocating movement is imparted to said slide bars by gear sectors 78 and 79 in mesh therewith respectively. The gear sectors 78 and 79 are fixed on a pair of transverse shafts 76 and 77 journalled in suitable bearings carried by the plates 37 and 45, said shafts projecting rearwardly beyond the plate 37 and having fixed thereon crank arms 74 and 75 as most clearly shown in FIGURE 3.

Oscillatory movement is imparted to the shafts 76 and 77 and thereby to the gear sectors 78 and 79 by the mechanism shown in FIGURE 3 and which will now be described.

Figure 3:
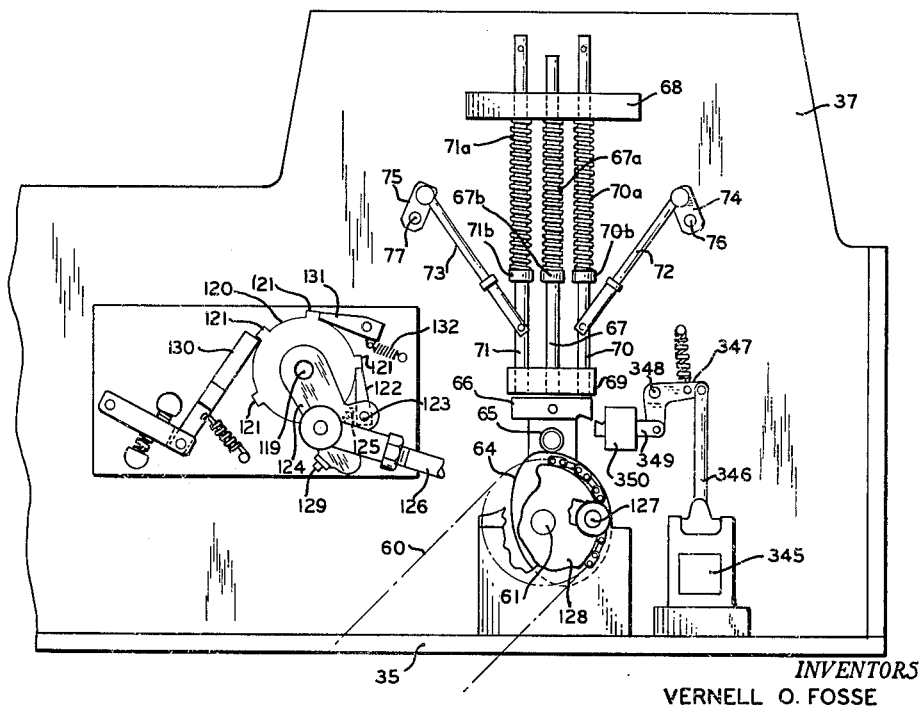
FIGURE 3 is an enlarged fragmentary view in vertical section taken along the line 3—3 of FIGURE 2, certain of the parts being shown in side elevation.

As shown in FIGURE 3, a cam 64 is secured on the main feeder drive shaft 61 and cooperates with a cam following roller 65 imparting vertical reciprocation to the latter. The cam follower 65 is carried by a T-shaped member 66 having the leg thereof bifurcated to straddle the shaft 61. Connected by a suitable pin to the upper cross portion of member 66 is a vertically extending rod 67 which slides in vertically aligned bores formed in a pair of guide blocks 68 and 69. The rod 67 serves to guide the vertical reciprocation of T-shaped member 66. Positioned on opposite sides of the rod 67 are rods 70 and 71 extending through the blocks 68 and 69 in the same manner as the rod 67 and having their lower ends abutting the T-shaped member 66. The rods 67, 70 and 71 are biased downwardly by helical compression springs 67a, 70a and 71a which surround said rods respectively. The springs 67a, 70a and 71a engage the upper guide block 68 at one end and at the other end engage suitable shoulder means 67a, 70b and 71b respectively on the rods 67, 70 and 71, as shown. The springs 67a, 70a and 71a, acting through rods 67, 70 and 71 bias the cam follower 65 into constant engagement with the cam 64. A connecting rod 72 links the rod 70 to the crank arm 74, and a similar connecting rod 73 links the rod 71 to the crank arm 75. Vertical downward movement of rod 70 imparts counterclockwise rotary movement to the crank 74, shaft 76 and gear sector 78 as viewed in FIGURE 3, such movement appearing clockwise in FIGURE 4. Similarly, vertical downward movement of the rod 71 imparts clockwise rotary movement to the crank 75, shaft 77, and gear sector 79 as viewed in FIGURE 3, such movement appearing in FIGURE 4 as counterclockwise. Conversely, vertical upward movement of the shafts 70 and 71 causes reverse rotary movement of the gear sectors 78 and 79 through the medium of the aforedescribed connecting rods, crank arms, and shafts.

It is thus apparent that continuous rotation of the cam 64 with the shaft 61 causes simultaneous oscillatory movement of the sectors 78 and 79 in opposite directions, and thereby causes simultaneous reciprocatory movement of the slide bars 80 and 81 in opposite directions below the files 20 and 21 to effect simultaneous feeding of the lowermost card in each of said files to the feed rollers 55 and 56 of said files by virtue of engagement of the shoulder portions 54a of the lugs 54 with the outer edge of said cards.

A card is fed from the bottom of each file in this manner and drops from the feed rollers into the receiving bin 23. When the two cards are thus superimposed in the bin 23 with the card 11 from file 20 on the bottom, the cards are directed to the right along the plate 52 toward the loading station 59 shown in FIGURE 4 by a pair of reciprocatory laterally aligned guides or pusher members 57, only one of which is shown. The members 57 project through slotted openings 52a in the plate 52 also shown in FIGURE 2.

The guide or pusher members 57 are mounted in laterally spaced relation on a slide bar or plate-like member 85 having a depending dovetail block 86 secured thereto and fitted between and slidably engaged by a pair of complementary bars 87, only one of which is shown in the drawing. The bars 87 are secured to the support plate 84 and suitably guide the movement of the member 85. Reciprocatory movement is imparted to the slide bar 85 and thereby to the pusher members 57 through a lug 88 depending from the block 86 and extending through a slotted opening 84a in plate 84. The lug 88 is pivotally connected to a link 89, the other end of which is pivotally connected to the upper end of an elongated oscillatory lever 90, the lower end of said lever being pivotally connected to a suitably journalled transverse shaft 91.

A bell crank lever 92 is secured to the shaft 91 and has an arm 92a carrying a cam following roller 94 which is biased by a spring 96 into engagement with a cam 95 fixed on the shaft 61. The tension spring 96 is secured at one end to the bell crank 92 and at its other end to the deck 35. The bell crank lever 92 also has an arm 92b which has shoulder means positioned to engage a latch member 97 pivoted by a suitable pin 97a to the lever 90. By virtue of the engagement of the shoulder means of bell crank arm 92b with the latch 97, clockwise rotary movement of the bell crank 92 swings the lever 90 toward the right, as viewed in FIGURE 4, thus moving the slide plate 85 and pusher member 57 in the same direction to direct the superimposed cards from the receiving bin or station 23 into the waiting or loading station 59. A spring 98 biases the latch member 97 in a counterclockwise direction into engagement with a stop member 90a carried by a projection 90b on the lever 90 to which projection said spring is anchored. A large tension spring 99 secured at one end to the lever 90 and secured at its other end, as to the deck plate 35, biases the lever 90 toward the left as viewed in FIGURE 4 and acts to forcibly return the lever 90 toward the position shown in the drawing whenever the position of the bell crank 92 permits. The continuing rotation of the cam 95 with shaft 61 imparts continuous oscillatory movement to the bell crank lever 92, and so long as the latch member 97 of lever 90 is positioned for engagement with the cooperating shoulder means of the bell crank 92, like oscillatory movement is imparted to the lever 90 and pusher members 57.

The pusher members 58 are moved to the right as viewed in FIGURE 4 in unison with the guides 57 and are carried by mounting means on the slide bar 85 which comprises a block 100 fixed on the slide bar 85 adjacent the guides 57. The block 100 provides a journal support for a transverse rod 101 which has secured thereto a set of laterally spaced pusher bars 102, only one of which is shown, said bars carrying at their outer ends the card engaging pusher members 58. The pusher bars 102 are formed of thin relatively flexible sheet material affording sufficient flexibility to prevent damage to the cards. The members 58, when in the raised position shown in FIGURE 4, are adapted to engage the edge of a pair of cards in the waiting station 59 forcing them out into a card-receiving pocket member 24 on the conveyor 25 by movement of the members 58 toward the right simultaneously with the pusher members 57.

The members 58 are biased upwardly toward the position shown in FIGURE 4 by a suitable helical spring (not shown) which is wrapped around the rod 101. The members 58 travel in the same slots 52a in the plate 52 as the pusher members 57, and the transverse bar 83 is suitably cut away to afford clearance for such movement. During return of the members 58 to the left as viewed in FIGURE 4, said members assume a position below the plate 52 and under the set of cards forced into the loading station 59 by the advance of members 57. As members 58 reach the position thereof shown in FIGURE 4 on such return movement, said members are again raised to their operative position shown. To effect such movement, suitable camming means is provided which comprises a flat bar cam 103 the upper surface of which engages a cam follower 104 rotatably mounted on a radial crank arm 105 secured to the rod 101. The cam 103 is fixed to the upper end of a vertical shaft 107 slidable within a sleeve bearing 108 fixed to the support plate 84. One end of the cam bar 103 is vertically slidable within a slotted block 106 fixed to the upper surface of the support plate 84, said block preventing any rotary movement of said cam bar. Upward movement of the cam bar 103 pivots crank arm 100 and pusher arm 102 clockwise against the bias of the spring on rod 101 to lower the pusher members 58 to positions below the plate 52. On subsequent lowering of the cam bar 103, the aforementioned helical spring causes counterclockwise movement of crank arm 100 and arms 102 to thereby return the pusher members 58 to their raised position shown.

Vertical reciprocating movement of the cam bar 103 in timed relation with the horizontal reciprocatory movement of the slide bar 85 and pusher members 57 and 58 is provided by mechanism comprising a connecting rod 109 pinned, as at 110, to the lower end of the rod 107. The lower end of connecting rod 109 is bifurcated to fit over the main shaft 61 and carries a cam following roller 111 intermediate its ends. The follower 111 engages a cam 112 fixed on the shaft 61. As the cam 112 rotates, vertical translational movement is imparted to the cam bar 103 through the connecting rod 109 and rod 107.

*Conveyor*

As shown diagrammatically in FIGURE 12, the conveyor 25 serves to advance and support a continuous series of pairs of superimposed cards across the exposure unit 26 to expose said cards and impart a latent image to the film section 16 of the duplicate card of each pair. Referring also to FIGURES 1, 4, 5 and 6, the conveyor 25 comprises in addition to the card-receiving pockets 24 aforementioned, endless conveying means which, in the illustrated form of the invention, comprises a pair of endless chains 113 and 114 entrained on a set of sprockets 115 and 116 at the left hand side of the machine and a similar set of suitably mounted rotary sprockets 117 and 118 at the right hand side. As shown, the chains 113 and 114 have elongated straight-line upper and lower stretches extending between the sprockets around which they are trained. The sprockets 115 and 116 are suitably mounted on a drive shaft 119 suitably journalled in the vertical plates 36 and 37. One end of the shaft 119 extends rearwardly beyond the plate 37 and has secured thereto a wheel 120 (see FIGURE 3) carrying circumferentially spaced rectangular lugs 121.

The wheel 120 forms part of an intermittent drive means for the conveyor 25 which includes a pivoted pawl 122 connected by a pin 123 to a crank arm 124 which is free to oscillate on the shaft 119. The pawl 122 is biased toward the wheel 120 by a suitable spring 125. The crank arm 124 is drivingly connected to a connecting rod 126, the other end of which is eccentrically connected by a stud 127 to a crank disc 128, which is shown partially broken away in FIGURE 3. The crank disc is keyed or otherwise secured to the drive shaft 61 and with the connecting rod 126 provides a pitman connection which causes the crank arm 124 to oscillate about shaft 119 in response to rotation of the shaft 61. When arm 124 is swung clockwise, the pawl 122 is retracted into driving engagement with the next succeeding lug 121, and by the same motion a projecting stud 129 on said crank arm engages and releases a spring loaded locking pawl 130 from another of the lugs 121. Subsequent counterclockwise movement of the crank 124 and lug 122 causes similar rotation of the wheel 120 and shaft 119. A third pivoted pawl 131 is continuously pressed by a suitable spring 132 against the wheel 120 and prevents any reverse rotation of the wheel 120 during the clockwise movement of crank arm 124.

Thus an intermittent drive is provided for the sprockets 115 and 116 of the conveyor, said drive properly positioning successive card-receiving pockets 24 in adjacent aligned relation with the loading station 59.

Figure 5A:
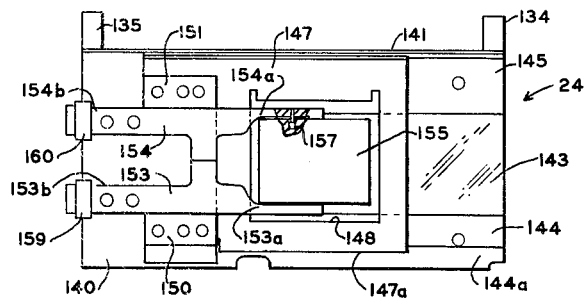
FIGURE 5a is an enlarged fragmentary plan view of a card-supporting pocket taken along the line 5a—5a of FIGURE 5.

Each pocket 24 (see FIGURES 4, 5 and 5a) is supported on the endless chains 113 and 114 by a pair of spaced longitudinal bars 134 and 135 pivotally connected to said chains respectively. The bars 134 and 135 are connected by suitable pins to transversely aligned pairs of T-shaped links 136 forming part of said chains. The bars 134 and 135 are slotted at their trailing ends to receive the connecting pins, travel of said pins in said slots allowing unrestrained travel of the pockets around the sprockets.

Supported on and secured to the bars 134 and 135 is a flat transversely extending base plate 140 having an upwardly bent flange portion 141 at its leading edge. The base plate 140 is provided with a centrally located preferably rectangular opening or aperture 142 corresponding generally to the apertures in the card members. Overlaying the base plate 140 and the opening 142 is a flat glass plate 143, trapezoidal in cross section and retained on the plate 140 by complementary transverse bars 144 and 145. The plate 143 is preferably of a type of material such as Pyrex which efficiently passes ultraviolet rays, there being a compressible gasket 146 positioned between plates 143 and 140. The bar 144 has a beveled trailing edge 144a to act as a guide for the leading edge of the cards as they are directed from the loading station 59 onto the member 143 and the bars 144 and 145.

Fixed to and in registry with the base plate 140 in closely spaced parallel relation to the upper surface of the glass plate 143 is a rectangular plate 147 having a rectangular opening 148 of a size greater than those of the apertures in the aperture cards 11 and 14 aforementioned. The trailing edge of the plate 147 is bent upwardly at an angle corresponding to the angularity of the bevelled surface 144a of bar 144 and forms upper card guiding means complementary thereto. The opening 148 in the plate 147 and the window formed by the opening 142 and the light permeable plate 143 are in vertically aligned relation with each other and with the apertures in the superimposed cards 14 and 11, when said cards are inserted in the pockets between the glass plate 143 and upper plate 147.

Mounted on the pockets adjacent the end of plate 140 nearest the conveyor chain 114 are two spaced blocks 150 and 151 which carry the opposite end portions of a longitudinal pivot pin 152 extending from one block to the other. A pair of transverse arms 153 and 154 are pivoted intermediate their ends on the pin 152 and fit between the blocks 150 and 151. The pivoted arms 153 and 154 are allochiral and respectively have slender end portions 153a and 154a which extend in parallel spaced relation from the pivot to approximately the longitudinal center line of the opening 148. Fitted between the end portions 153a and 154a is a flat rectangular pressure plate or platen 155. The platen 155 is pivoted about an axis intermediate its center by suitable pins 156 and 157 (see FIGURES 5 and 5a) to the ends of arms 153 and 154 respectively. The platen 155 is adapted to engage the cards placed in the pocket 24 and to completely cover the film portion of the superposed duplicate card. The arms 153 and 154 have outer end portions 153b and 154b respectively, and interposed between said arm portions and the base plate 140 are compression springs 158 which bias said arms in the direction to force the platen 155 toward the cards, thereby pressing the cards into the firm engagement necessary to afford the proper contact between the film sections required for the production of copies having good resolution.

The end portions 153b and 154b carry rollers 159 and 160 suitably journalled thereon and which act as cam followers which when pressed downwardly against the pressure of springs 158, cause raising of the platen 155 allowing the insertion or removal of the cards from the pockets. Means is provided for depressing the cam following rollers 159 and 160 when a given pocket 24 is aligned with the loading station 59, said means comprising a pivoted lever 161 having a roller engaging camming surface 161a, see FIGURES 4 and 5. The lever 161 is pivotally connected at one end by a suitable pin 162 to the adjacent vertical plate 37, and is connected at its opposite end to one end of a vertical connecting rod 163, as by a pin 164. The other end of rod 163 is connected by a pin 165 to a bell-crank lever 166 rockably mounted on a suitable shaft or stud 167 projecting from the plate 37. The free end of the bell-crank arm 166 carries a cam following roller 168 cooperable with a cam 169 secured to the shaft 61 adjacent plate 37. A tension spring 166a biases the bell-crank lever 166 counterclockwise as viewed in FIGURE 4, to thereby maintain the follower in contact with the cam 169. Rotation of shaft 61 imparts a rocking movement to bell-crank arm 166 through cam 169, causing the lever 161 to vertically oscillate about the pin 162. As each pocket 24 is successively brought into registry with the loading station 59, the lever 161 moves downwardly to depress the rollers 159 and 160 and to correspondingly raise the platen 155 of said pocket to permit a pair of cards to be moved from the loading station into said pocket by the pusher members 58. Following insertion of the cards into the pocket 24, the lever 161 is raised to permit the spring 158 to move the platen into firm clamping engagement with said cards in the pocket.

Figure 5:
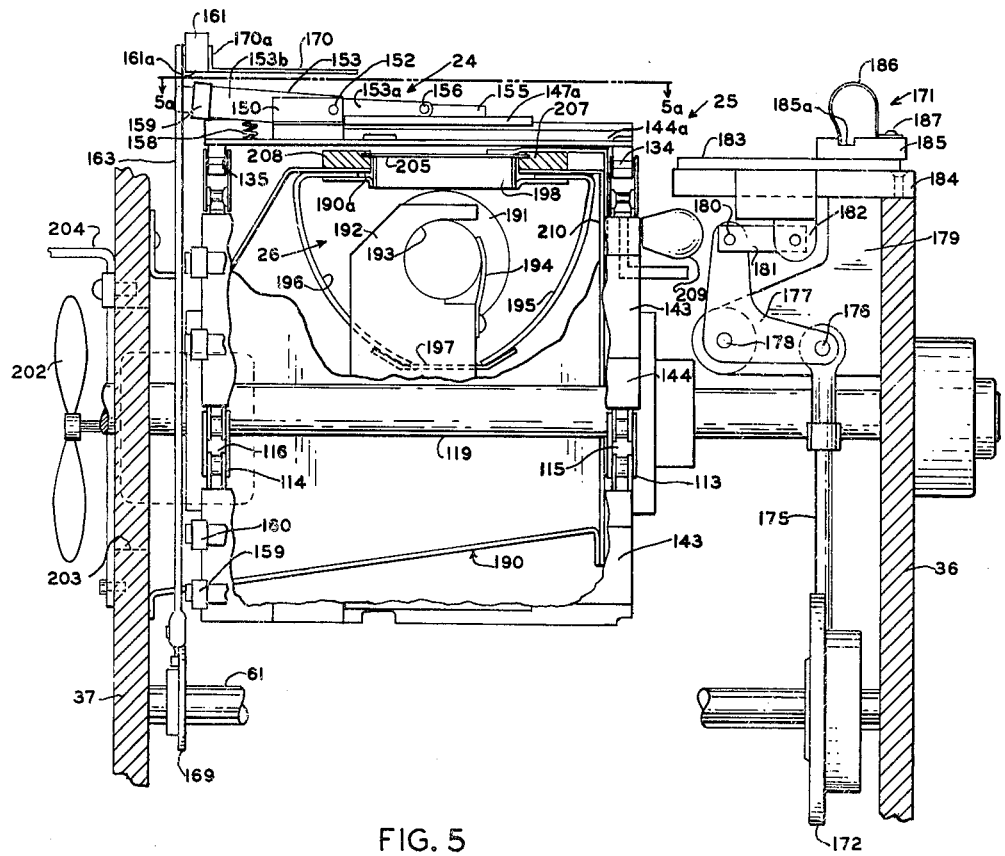
FIGURE 5 is an enlarged fragmentary view in vertical section taken approximately along the line 5—5 of FIGURE 1 and showing the conveyor and exposure unit of the apparatus in end elevation, certain of the parts being broken away and certain parts located interiorly being shown in phantom lines.

The lever 161 carries a guide member 170 which is attached at one end 170a to said lever and has a downwardly bent arcuate guide portion 170b on its opposite end. The guide portion 170b aids in guiding the superimposed cards as they are moved from the loading station 95 into the pockets 24. During insertion of the superimposed cards into a pocket 24, proper longitudinal alignment thereof is insured by the fact that the pusher members 58 move said cards into firm contact with the upstanding flange 141 of base plate 140. Proper transverse alignment of the superimposed cards is provided by an aligning assembly generally designated 171 (FIGURE 5). This assembly comprises a pair of inverted U-shaped leaf springs 186 carried by a transversely reciprocatable head 185, said springs being engageable with the ends of the cards to move the same in a direction transverse to the conveyor 25, forcing the cards into firm contact with the inner faces of the blocks 150 and 151. The head 185 is driven in timed relation with the raising of the platen 155 by mechanism including a cam 172 (see FIGURES 4 and 5) positioned adjacent the plate 36 and fixedly mounted on the shaft 61. A cam following roller 173 is carried on a suitably mounted bell-crank arm 174 and is biased into engagement with the cam 172 by a tension spring 174a. Rotation of shaft 61 and cam 172 imparts rocking motion to the bell-crank lever 174 which, in turn, imparts vertical reciprocatory movement to a connecting rod 175. The connecting rod 175 is pivoted at its upper end as by a pin 176 to one end of a second bell-crank lever 177. The bell-crank lever 177 is pivoted on a pin 178 carried by a bracket 179, secured to and extending normal to the plate 36. The other arm of the bell-crank 177 is pivotally connected, as by pin 180, to a link 181, and said link 181 is connected at its opposite end to a depending bracket member 182 carried by a slide bar 183. The bracket member 182 and a similar bracket member (not shown) are disposed on opposite sides of a transverse horizontal guide bar 184 which is secured to and extends normal to the plate 36 in line with the upper portion of bracket 179. The slide bar 183 is slidable transversely along the guide bar 184 and carries the head 185 on its upper surface. The head 185 is provided with a longitudinal groove or channel 185a in the upper surface thereof.

The U-shaped leaf springs 186 are fixed at one end only to the head 185, as by suitable screws 187. The free ends of the springs 186 are accommodated within the channel 185a and can move transversely therein. The leaf springs 186 are positioned in line with the plane of the upper surface of the glass plate 143 of the associated pocket 24 as indicated by the card line in FIGURE 5. The springs 186 are sufficiently flexible to prevent damage to the cards and can flex within the limits permitted by the channel 185a.

After the cards are in proper registry within the pocket 24, the platen 155 presses them together and holds them so that there is no possibility for shifting of one card relative to the other as the pocket is carried by the conveyor chains 113 and 114 across the exposure unit 26 during the printing operation.

*The exposure unit*

The exposure unit 26 provides sufficient printing light to print the duplicate card film sections, projecting the light upward through the window 142. The exposure unit comprises suitable top, bottom, front and end walls which with the plate 37 form an elongated generally rectangular exposure chamber or enclosure generally designated 190 which extends between the two sets of sprockets 115, 116, 117 and 118 and is positioned between the two straight line stretches of the conveyor 25. The chamber 190 has an opening 190a in the top wall thereof through which the exposing light is directed to pass through the image area of the film section in the master card for printing of the duplicate film section as said cards traverse the exposure unit in the card-receiving pockets 24.

A suitable source of intense radiation, such as a 2200 watt mercury vapor lamp 191, is mounted within the exposure chamber 190. The illustrated lamp is elongated and tubular and is supported at its opposite ends by suitable brackets 192 having lamp receiving sockets 193. The lamp 191 is held in the sockets 193 by retaining clips 194 and is joined electrically to a suitable current supply by conventional means (not shown).

Arranged within the elongated exposure chamber 190 and extending the length thereof is a parabolic type reflector comprising two arcuate reflector sections 195 and 196 suitably secured at their upper edges to the chamber 190. The bottom edges of the reflector sections are secured to a narrow perforated horizontal plate 197 extending the length of the chamber 190. The reflector directs the rays of light impinging thereagainst upwardly through the opening 190a toward the card-receiving pockets thereabove insuring thereat an abundance of usable light.

Positioned in the opening 190a are a plurality of transverse vertical baffles 198 spaced approximately three-eighths of an inch (⅜") apart. The baffles 198 insure the emission from the exposure chamber of only rays of light which are substantially normal to the axis of the lamp 191. Thus, the film sections in the cards receive the proper amount of light to produce copies with good resolution.

The lamp 191 is suitably cooled during operation of the machine by three fans 200, 201 and 202 mounted in accommodating air outlet openings 203 in the plate 37. FIGURE 1 shows the fan 200 centrally located relative to the exposure chamber 190. This fan 200 is connected to a suitable circuit (not shown) including the main switch of the machine and is operated whenever the machine is turned on. The fans 201 and 202 (FIGURE 5) are positioned on opposite sides of the fan 200 and are operated by a suitable thermostatic switch (not shown) which supplies electrical power to said fans whenever the chamber reaches a predetermined temperature.

The fans 200, 201 and 202 draw air down through the baffles 198 in the opening 190a, around the lamp 191, through the perforations in the plate 197 and out through the openings 203 to a suitable plenum chamber 204 (FIGURE 2) positioned on the opposite side of the vertical plate 37. From the plenum chamber 204 the air may be exhausted from the area of the machine through suitable ventilator or chimney means connected, for example, to an exhaust fitting 204a.

Positioned above theopening 190a and the baffles 198 of the exposure chamber 190 are elongated shutters 205 and 206, see FIGURE 2, slidably mounted in suitable grooves formed in the inner surfaces of a pair of elongated longitudinal guide members 207 and 208. The shutters are adjustable toward and away from each other to vary the effective length of the opening 190a and thereby the amount of light to which the cards are exposed as the pockets traverse the exposure chamber 190. The shutters 205 and 206 may be manually set in the selected position over the baffles 198 by movement of suitable handles 209 which may be secured to said baffles by straps 210, as shown, or by other suitable positioning mechanisms either manual or otherwise.

As the pockets 24 carrying the superimposed film sections move beyond the exposure unit 26, they are carried around the set of sprockets 117, 118, and arrive in inverted position adjacent an unloading station generally designated 212.

*Removal and separating mechanism*

As previously described, the cards are positioned in the card pockets 24 with the duplicate card 14 overlying the master card 11 as they are directed across the exposure unit 26. Upon reaching the unloading station or area 212, the cards, like the carrying pocket 24, are inverted and they are removed from the pockets 24 when in this relationship.

Figure 6:
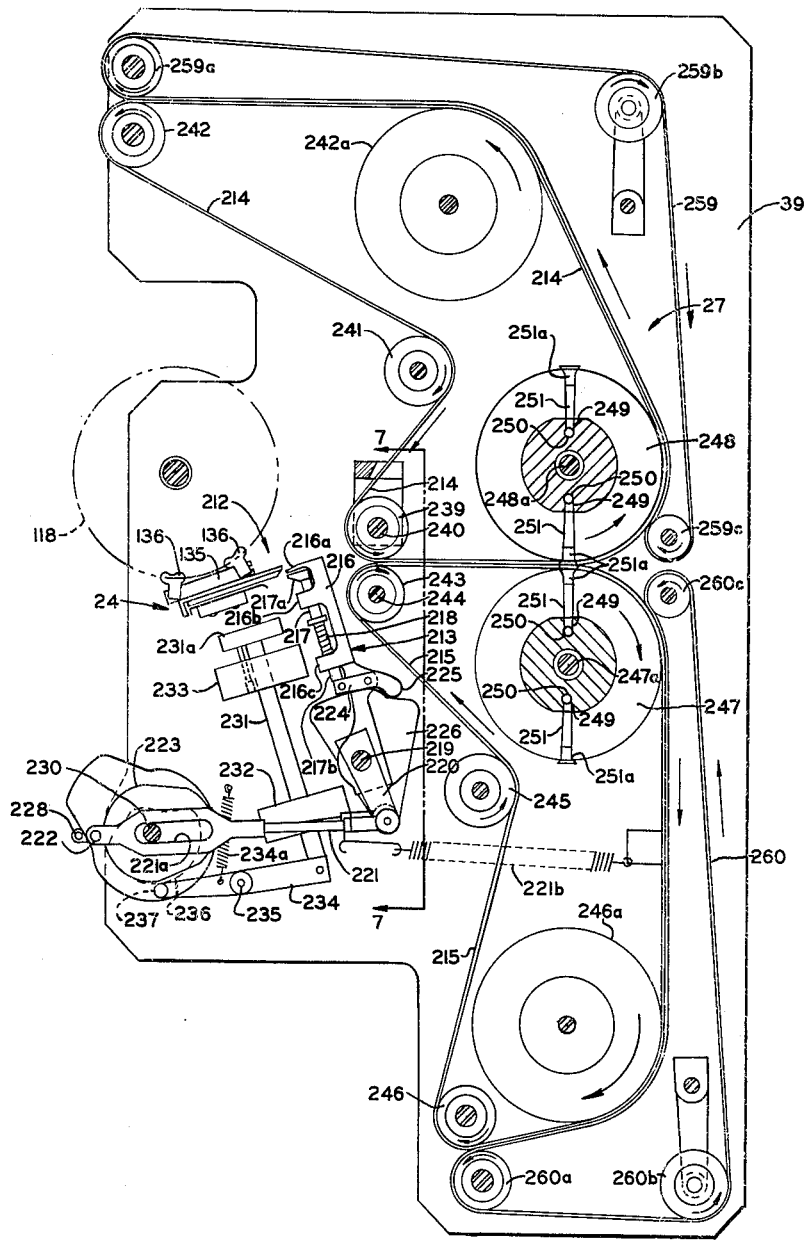
FIGURE 6 is an enlarged fragmentary vertical sectional view of the card removing and separating mechanism taken along the line 6—6 of FIGURE 2.
Figure 7:
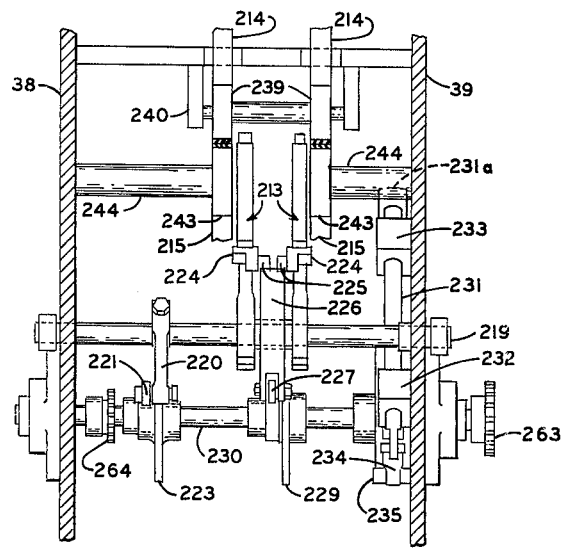
FIGURE 7 is a fragmentary transverse vertical sectional view taken along the line 7—7 of FIGURE 6.

Means is provided at the unloading station for removing the cards from the pockets 24, and said means comprise a pair of mechanical fingers 213 (FIGURES 1, 6 and 7). The fingers 213 function to pick the cards from the pockets 24 and place them between an upper set of spaced endless belts 214 and a lower set 215 constituting part of the conveyor means in the card separating mechanism 27. After insertion of the cards between the belts 214 and 215, the cards are separated by means which will be described later, the master card being conveyed to a first stack and the duplicate card to the developing chamber 29.

The fingers 213 oscillate back and forth between the card pockets 24 and the sets of belts 214 and 215 as the pockets successively arrive at the unloading area 212. The fingers 213 are each formed by an elongated substantially L-shaped member 216 and a shorter L-shaped jaw member 217 having cooperating jaw portions 216a and 217a respectively. The members 216 are formed with bearing portions 216b and 216c (FIGURE 6) in which the legs 217b of the jaw member 217 are slidably journalled, there being a compression spring 218 surrounding each leg portion 217b and biasing the jaw members 217 in the direction to move the jaw portion 217a thereof toward the jaw portion 216a of the member 216. The lower end portion of the members 216 are fixed onto a transverse shaft 219 which is journalled in suitable bearings in plates 38 and 39 (FIGURE 7) and is rotated back and forth through a predetermined arc to afford the member 216 the aforementioned oscillatory movement. The shaft 219 is driven by means including a crank arm 220 fixed thereon having a pivotal connection with one end of a connecting rod 221 which is slotted at 221a (FIGURE 6) adjacent the opposite end thereof to fit over a transverse shaft 230. The rod 221 also carries at its end adjacent the shaft 230 a cam following roller 222 cooperable with a cam 223 fixed on the shaft 230. The shaft 230, like shaft 219, is mounted in suitable bearings in the plates 38 and 39. A tension spring 221b which is connected at one end to the connecting rod 221 and is suitably anchored at its other end holds the cam follower 222 against the peripheral surface of the cam 223 such that rotation of the shaft 230 and thereby of the cam 223 causes oscillatory longitudinal movement of said connecting rod and thereby the aforementioned oscillatory movement of the fingers 213.

Opening and closing movement of the L-shaped jaw members 217 in proper sequence to grasp cards in a pocket 24 at the unloading station and to release said cards upon delivery thereof to the belts 214 and 215 is accomplished by means including crank arms 224 pivoted intermediate the ends thereof to the L-shaped members 216. The crank arms 224 are pivotally connected at one end to the lower end of the jaw members 217 and carry on the opposite end thereof cam following rollers 225 which are biased into engagement with a cam 226 by the action of the compression springs 218 around the jaw members 217. The cam 226 is journalled on the shaft 219 and is caused to oscillate through a predetermined arc by connection thereto of a connecting rod 227 which may be substantially identical with the rod 221 and is similarly associated with the shaft 230. The rod 227 carries a cam following roller 228 cooperable with a cam 229 which is also fixed on the shaft 230 (FIGURE 7). The rotation of shaft 230 and cam 229 thus causes oscillatory movement of the connecting rod 227 and corresponding rocking movement of the cam 226 in timed relation with the oscillatory movement of the fingers 213 so that the levers 224 and jaw members 217 are actuated to release a pair of grasped cards as said cards are delivered between the belts 214 and 215. At this point the fingers 213 are being swung toward the right (FIGURE 6) at a speed greater than that of the belts 214 and 215 in order to prevent any damage to the cards by the belts and/or fingers. Return movement of the fingers 213 is initiated after the cards have been moved clear of said fingers by the belts 214 and 215. During such return movement of the fingers 213 the levers 224 are actuated by the cam 226 to move the jaw members 217 to open position, and upon reaching the end of said return movement the jaw portions of the fingers are in a position to grasp the cards in the next succeeding pocket 24 which has been moved to the unloading station in the meantime. At this point the cam 226 actuates the levers 224 in the direction to permit the springs 218 to force the jaw members 217 to closed position.

In order to permit the fingers 213 to remove the cards from the pocket 24 at the unloading station, means is provided for releasing the platen 155 of said pocket at the proper time, said means comprising a push rod 231 slidably mounted in suitable bearing blocks 232 and 233 on plate 39. The rod 231 carries a head portion 231a which is movable into depressing engagement with the rollers 159 and 160 of the pocket 24 at the unloading station to retract the platen 155 thereof from the cards in said pocket. The push rod 231 is moved by connection of the lower end thereof with a lever 234 which is pivoted about a pivot pin 235 fixed to the plate 39. The lever 234 carries cam following roller 237 which is biased by a spring 234a into engagement with a cam 236 fixed on shaft 230. Rotation of the shaft 230 and cam 236 thus causes rocking movement of the lever 234 and oscillatory axial movement of the push rod 231 effecting platen release at the proper timed interval, i.e., while a pocket 24 is at rest at the unloading station.

The endless conveyors 214 and 215 each comprise a pair of laterally spaced belts positioned to engage the cards on each side of the film section. The belts of the conveyor 214 move in a generally counterclockwise direction, as indicated by the arrows, around the idler pulleys 239 journalled on a suitably mounted transverse shaft 240 (FIGURES 6 and 7). The belts of the conveyor 214 are also trained around sets of suitably mounted idler pulleys 241, 242 and 242a as shown. The conveyor 215 comprises a set of spaced belts which engage the belts of conveyor 214 and move in a generally clockwise direction as indicated by the arrows. The belts 215 are also trained around a pair of pulleys 243 which are mounted on suitable stub shafts 244 (FIGURE 7) carried by the plate members 38 and 39. The belts of the conveyor 215 are also trained around sets of suitably mounted idler pulleys 245, 246 and 246a as shown. The conveyor belts 214 and 215 are respectively trained around and driven by a pair of similar generally dumbbell-shaped pulleys 247 and 248 fixed on suitably mounted transverse shafts 247a and 248a respectively. As best shown in FIGURES 2 and 6, each pulley has a hub portion and a pair of spaced belt-engaging disc portions. The hub portion is formed between said discs with diametrically opposed pairs of radial bores 249 having inserted therein and projecting therefrom radially extending nipples 251 carrying resilient suction cups 251a. The hubs of the pulleys 247 and 248 are also formed with axial bores 250 communicating with the inner ends of the radial bores 249 and extending to the rear end of said hubs for co-action with rotary valve devices 252 (FIGURE 2) connected by suitable vacuum hoses 253 and 254 to a single vacuum line 255 leading to an electric motor-driven vacuum pump 256.

A pair of endless belt conveyors 259 cooperate with the conveyor belts 214 and are trained around suitably mounted sets of idler pulleys 259a and 259b and drive pulleys 259c. The conveyor belts 259 travel in contact with the portions of the belts 214 extending from the drive pulley 248 over the idler 242a to the idler 242. A pair of endless belts 260 cooperate with the belts 215 and are trained around suitably mounted sets of idler pulleys 260a and 260b and drive pulleys 260c. The belts 260 travel in contact with the portions of the belts 215 extending from the drive pulley 247 over the idler 246a to the idler 246.

The set of cards delivered by the fingers 213 are carried by the engaging conveyors 215 and 216 in superimposed relation to the dumbbell pulleys 247 and 248 and the opposing suction cups 251 thereof draw the cards apart, holding the upper card against the belts 214 and the lower card against the belts 215. The master card is thus directed upwardly between the contacting extents of the conveyors 214 and 259 and is carried thereby to a suitable bin 28 (FIGURE 1) which receives and stacks the master cards in the original order. The separated duplicate or copy card is directed downwardly between the contacting extents of the conveyors 215 and 260 and is carried thereby to the developing unit 29 to be hereinafter described.

The removing and separating mechanism is driven from the main drive shaft 42 by a chain 262 trained around a suitable sprocket on shaft 42 and a sprocket 263 on the shaft 230, see FIGURES 1 and 7. The shaft 230 has a second sprocket 264 fixed thereon which is drivingly connected to a suitable sprocket on the shaft 247a by a chain 265. The shaft 247a has fixed thereon a gear (not shown) having substantially the same diameter as the belt engaging portion of the pulley 247, said gear being intermeshed with a similar gear 248b (FIGURE 2) fixed on shaft 248a. Rotation of the drive pulleys 247 and 248 drives the conveyor belts 214, 215, 259 and 260 in the direction indicated by the arrows in FIGURE 6.

*The developing unit*

Figure 8:
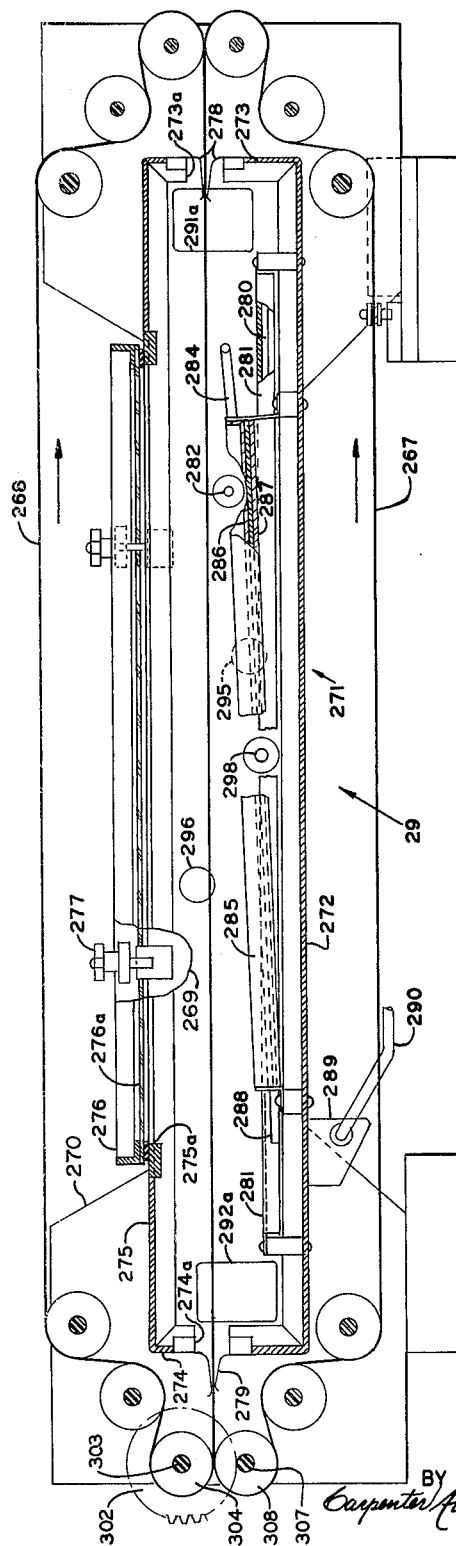
FIGURE 8 is an enlarged elevational view of the developing unit, one side being removed, and certain portions being broken away.
Figure 9:
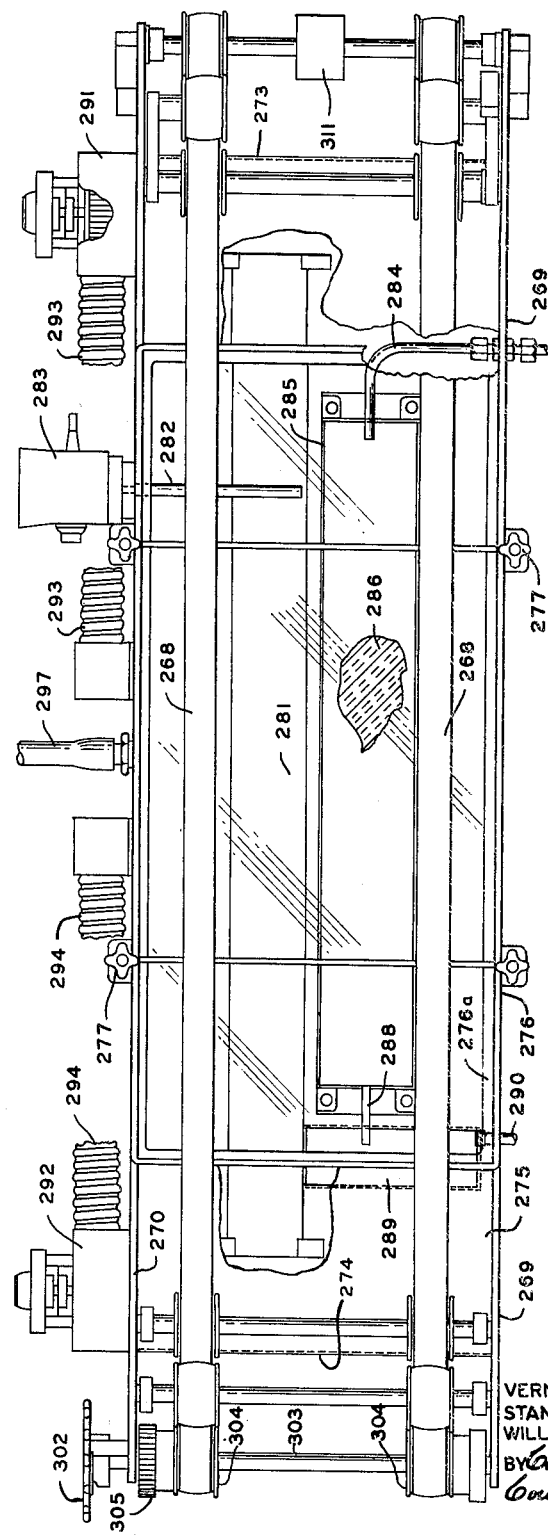
FIGURE 9 is a plan view of the developing unit of FIGURE 8, certain parts being broken away and certain parts being shown in phantom lines.

The successive duplicate cards 14 are fed from the conveyors 215 and 260 into sets of endless belt conveyors 267 and 268 of the developing unit 29 providing the means by which said cards are carried to and through the developing chamber 271, as best illustrated in FIGURES 8 and 9. The developing unit comprises a pair of spaced longitudinally extending vertical supporting plates 269 and 270 providing support for suitable bearings in which are journalled the numerous transverse shafts carrying the pulleys for supporting the belts 267 and 268, said pulleys being arranged as shown in FIGURES 8 and 9. The supporting plates 269 and 270 form front and rear side walls, respectively, for the developing enclosure or chamber 271 which also includes a bottom plate 272, end plates 273 and 274, and an upper plate 275. The upper plate 275 is provided with a rectangular opening 275a which is sealed by a removable cover 276 having a large transparent window 276a formed therein. The cover is retained in sealing engagement with the upper plate 275 over the opening 275a by conventional screw clamps 277.

The belts of the sets of conveyors 267 and 268 each have a substantially straight line stretch extending through the enclosure 271, said stretches of the conveyor 267 being in contact with those of the conveyors 268 and being adapted to engage and carry the cards therebetween. The cards enter the enclosure 271 through an inlet opening 273a in the end plate 273. Flexible flaps 278 are secured by suitable fastening means to the end plate 273 and form a partial closure for the inlet opening 273a allowing free entry of the cards and moving belts. The opposite end plate 274 is provided with an outlet opening 274a having similar flexible flaps 279 which partially close this opening and allow free egress of the belts and cards therethrough. Upon leaving the chamber 271, the cards are discharged from the conveyor belts 267 and 268 and drop into the bin or receptacle 30 (see FIGURE 1) in which they are stacked in the same order as the originals are stacked in the bin 28.

Referring again to FIGURE 8, the conveyor belts 268 are driven by a set of drive pulleys 304 fixed on a suitably mounted transverse drive shaft 303, and the conveyor belts 267 are driven by a set of drive pulleys 308 fixed on a suitably mounted transverse shaft 307. The shafts 303 and 307 have intermeshing gears of the same diameter fixed thereto, one of which is shown at 305 in FIGURE 9. The conveyors 267 and 268 are driven from the main shaft 42 (FIGURE 1) by a chain 301 trained around a suitable sprocket on said shaft and also trained around sprocket 302 fixed on the drive shaft 303 as shown in FIGURE 8.

Referring to FIGURE 9, the shafts corresponding to the shafts 303 and 307, at the entrance end of the enclosure 271, support a pair of cooperating rollers, one of which is illustrated at 311. The rollers 311 serve to straighten the cards as they are directed from the conveyors 215 and 260 of the separating mechanism to the conveyors 267 and 268 of the developing unit. The rollers 311 function to ensure that the cards are lying horizontally between the belts 267 and 268 as they are directed into the enclosure 271 by said belts.

As the cards are carried through the enclosure 271, they are subjected to an ammonia vapor atmosphere which develops the latent image on the diazo film section. The ammonia vapor atmosphere is provided within the enclosure 271 from a later-to-be-described source of aqueous ammonia solution having, for example, a concentration of 28 to 30% $NH_4$. The solution is fed into the chamber through a tube 284 leading from said source and extending through the plate 269, discharging into an elongated rectangular tray 285. The tray 285 is disposed below the mutual straight stretch of the belts 267 and 268 and is slightly inclined longitudinally as shown. The aqueous ammonia solution is discharged from the tube 284 into the upper end of the tray and onto a mat or plate 286 of porous ceramic material, for example, a mat formed of non-woven fiber glass which acts as a wick to distribute the ammonia solution over the entire surface of the tray.

Placed beneath the bottom of the tray 285 is an electric strip heater 287 (FIGURE 8) which is provided with a suitable thermostatic control (not shown) and which provides heat to said tray aiding in the vaporization of the ammonia solution.

The lower end of the tray 285 is provided with a discharge tube 288 through which any residual unvaporized ammonia solution is drained into a suitable reservoir 289. The residual solution is pumped out of the reservoir 289 through a tube 290 forming part of a liquid handling means to be described later.

Means is provided for circulating the ammonia vapor within the enclosure 271 and also for preventing the escape of the ammonia vapor from the enclosure. The aforementioned circulating means is illustrated as a pair of motor-driven vane type blowers 291 and 292 mounted on the outer side of the vertical plate 270 over suitable blower inlet openings 291a and 292a respectively formed in the plate 270 adjacent the inlet opening 273a and outlet opening 274a of the enclosure 271. The blower inlet openings by virtue of their locations, create sub-atmospheric zones within the enclosure 271 adjacent the enclosing inlet and outlet openings 273a and 274a, effectively providing a vacuum seal preventing escape of ammonia vapors through said last-mentioned enclosure openings. The ammonia vapor drawn into the blowers 291 and 292 is forced through flexible conduits 293 and 294 back into the enclosure 271 through openings 295 and 296 in the plate 270 disposed below and above the horizontal conveyor stretches respectively as shown in FIGURE 8.

The ammonia vapor is vented from the enclosure 271 through a vent tube 297 leading from an opening 298 in the side plate 270, said tube being connected at its upper end to a housing 299 for an exhaust fan 300 mounted on the plenum chamber 204 as shown in FIGURES 1 and 2. The fan 300 draws the vapor through the tube 297 and discharges said vapor into the plenum 204 to be exhausted therefrom with the exhaust cooling air.

Means is provided within the enclosure 271 to prevent a haze or moisture from forming on the film section passing therethrough. This means is illustrated as an elongated electric heater 280 enclosed by a cover plate 281 and disposed alongside the tray 285 as shown in FIGURE 9. The heater 280 extends substantially the full length of the enclosure 271 and is positioned beneath the straight line stretches of the conveyors 267 and 268 in an area which is directly beneath the path of travel of the film sections of the cards as they are directed through the enclosure. This heater serves to heat the film sections to a temperature sufficient to prevent any condensation thereon. Without the use of the heater 280, the film sections tend to develop a haze, and droplets of moisture tend to appear thereon from condensation of the ammonia vapor. When such condensation dries, there remains an objectionable white powder on the film. Positioned adjacent the heater 280 is a suitable thermostat 283 having a temperature sensing portion 282 extending through the side wall 270 and into the enclosure 271 above the heater 280. This thermostat is connected in circuit with the heater 280 and controls the operation thereof to maintain the optimum temperature for preventing the appearance of the aforementioned haze on the film sections.

Figure 10:
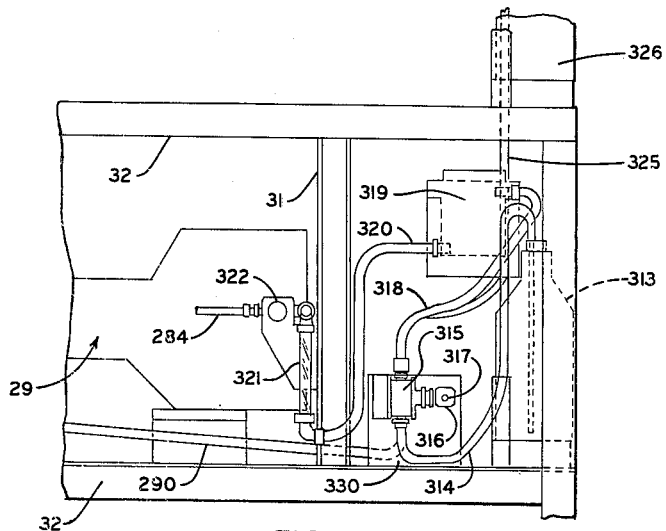
FIGURE 10 is a fragmentary elevation view showing the ammonia-feeding mechanism for the developing unit.

Fresh ammonia solution is delivered from a supply receptacle 313 and residual solution is returned to a residue receptacle 326 by a liquid handling system which will now be described, see FIGURES 1 and 10. One end of a tube 314 extends into the supply receptacle 313 and the other end thereof is connected to the inlet of a diaphragm pump 315. As illustrated in FIGURE 10, the pump 315 is operated by a cam 316 fixed on a suitably journalled transverse shaft 317. A conduit 318 delivers solution from the outlet of the pump 315 into a reservoir 319 suitably mounted at an elevation above the level of the upper end of the tray 285 in enclosure 271. From the reservoir 319 the solution is gravity fed through a tube 320, through a transparent vertically arranged flow gauge 321 and through a suitable metering valve 322 to the conduit 284. The flow of the ammonia into the developing chamber 29 through the conduit 284 is controlled by the metering valve 322 which may be either manually operated or controlled by a suitable electrically operated control means in cooperation with the previously referred to thermostatic switch controlling operation of the heater 287.

After a single pass over the porous plate or mat 286, the spent solution or residue collects in the reservoir 289 as aforesaid. This residue is pumped from the reservoir 289 through the conduit 290 by a diaphragm pump 323 and is discharged from the pump 323 into a tube 325 which carries it to the residue bottle 326 retained in a suitable bracket above the supply bottle 313. The pumps 315 and 323 are mounted in line by suitable bracket means 330 supported on the deck 34, and pump 323 is operated by a cam 324 secured to and rotated by the shaft 317. The common drive shaft 317 for the pumps 315 and 323 has a sprocket 360 fixed thereon which is connected by a chain 363 to a sprocket 361 fixed on the shaft 362 carrying the pulley 246a. The shaft 362 also has a sprocket (not shown) fixed thereon which may be identical with the sprocket 361, and a chain 364 connects said sprocket with a sprocket (not shown) fixed on the shaft 247a of the driving pulley 247. It will be apparent that rotation of the drive pulley 247 causes rotation of the shaft 317 and simultaneous operation of the pumps 315 and 323.

*Control mechanism*

Figure 11:
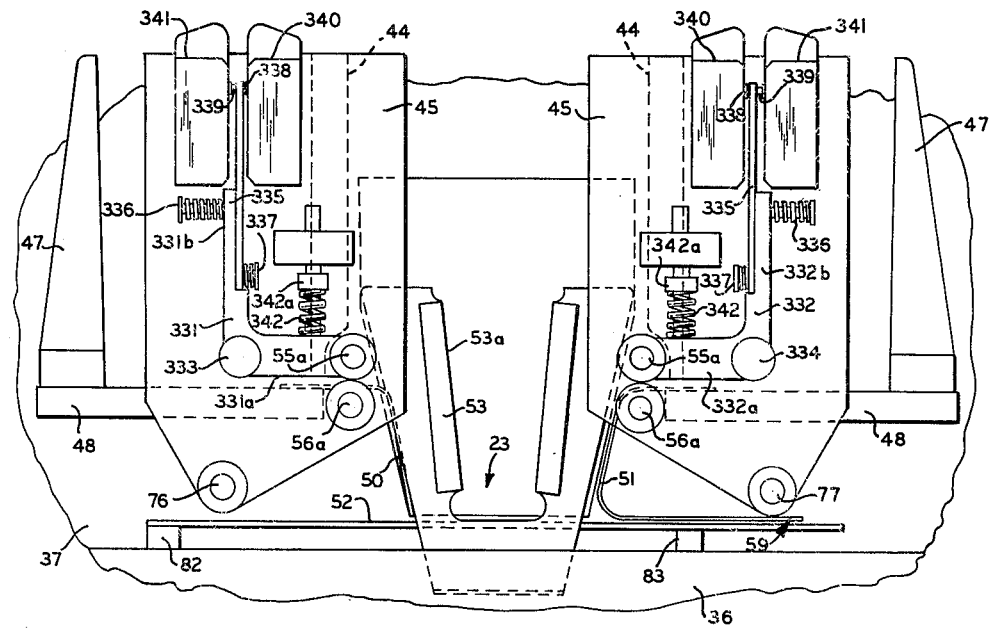
FIGURE 11 is an enlarged fragmentary elevation view of the card receptacles with certain parts removed.

The disclosed embodiment of the apparatus incorporates control mechanisms whereby the card feeding mechanism is stopped when a card is not fed from each of the storage receptacles 20 and 21 or when more than a single card is fed therefrom into the bin 23. These mechanisms are illustrated in FIGURES 3, 4 and 11. Referring to FIGURE 11, a pair of similar bell-crank levers 331 and 332 are pivotally mounted on suitable pins or cap screws 333 and 334 threaded into the front end walls 45 of the receptacles 20 and 21. The bell-crank levers have horizontal arms 331a and 332a journalling the shafts 55a in a manner such that vertical movement of the rollers 55 thereon causes pivotal movement of the bell cranks. The vertical arms 331b and 332b of the bell cranks 331 and 332 resiliently support wands 335 by means of spring pressed cap screws 336 and 337. The wands 335 are positioned between opposing buttons 338 and 339 of suitable normally open micro switches 340 and 341. The rollers 55 and shafts 55a are forced downward into engagement with the matching rollers 56 by compression springs 342 positioned between suitable adjustable shoulder means 342a and the arms 331a and 332a.

The compression springs 342 additionally hold the crank arms 331 and 332 in such a position that the wands 335 normally depress the buttons 338 of the micro switches 340 to close the contacts thereof. When a card is fed between the feed rollers 55 and 56, the arms 331a and 332a are pivoted upwardly an amount corresponding to the thickness of the card and sufficient to center the wand 335 so that neither of the switch buttons 338 and 339 is depressed and the contacts thereof are in their normal open positions. When more than one card is fed between the feed rollers 55 and 56 of either file 20 or 21, the corresponding crank arm 331 or 332 is pivoted over center an amount sufficient to cause the wand 335 to depress the button 339 of the associated micro switch 341 and close the contacts thereof.

A rotary switch 343 shown in FIGURE 2 is driven from the main drive shaft 42 by a suitable belt or chain 344. The rotary switch 343 is driven in timed relation with the feeder mechanism 22 and directs current to the switches 340 and 341 when a card is fed between the rollers 55 and 56. Unless the button 338 of each switch 340 is released and the contacts thereof opened by a card passing between the associated feed rollers 55 and 56, current from the switch 343 passes through the contacts of the unopened switch 340 to energize the solenoids 345 and 351 of the locking and release mechanisms which will be later described. Similarly, said solenoids are both energized by passage of more than one card between the feed rollers resulting in depression of a button 339 and closure of the contacts of a switch 341, since the switches 341 are also in circuit between the rotary switch 343 and both of said solenoids.

Referring to FIGURE 3, the solenoid 345 is mounted on the deck 35 and has its plunger attached to a connecting rod 346 which, in turn, is pinned to one arm of a bell-crank lever 347. The lever 347 is pivoted about a pin 348 secured to the plate member 37, and the other arm thereof is pivotally connected to a lock bar 349 slidably journalled in a fixed bearing block 350. The bar 349 is slidable to the left (FIGURE 3) to a locking position with respect to the T-shaped member 66 when the latter is raised, thereby preventing its further vertical actuation by the cam 64 and stopping operation of the card feeders 54. The slide bar is actuated to locking position by energization of the solenoid 35 rocking the crank 347 in a clockwise direction.

The solenoid 351 (FIGURE 4) when actuated exerts downward movement to a connecting link 352 pivotally connected thereto at one end and pivotally connected at its other end to a pivoted lever 353. The lever 353 is pivoted intermediate its ends on a suitable pin or stud 354 fixed to and projecting from the plate 37. The lever 353 at its free end is engageable with a pin 97b on the latch member 97 to pivot said latch member out of engagement with the shoulder means on arm 92b of the bell crank 92, and prevents further actuation of the pusher members 57 and 58. Solenoid 351, when actuated, thus prevents an improper number of cards placed in the receiving bin 23 from being directed to the loading station 59 by the pusher members 57. A spring 355 is connected at one end to the lever 353 and at its other end to the support plate 84, said spring serving to bias the lever 353 to its normal inoperative position which it allows the latch member 97 to engage the shoulder means of the crank arm 92b so that the feeder mechanism can operate normally.

The apparatus also includes a main control panel 356 (shown in FIGURE 2) mounted on the front of the machine. This control panel may have suitably mounted thereon a main switch to start the motor 39, a switch to light the exposure lamp 191, and a switch to turn the heater 280 on and off. Included also on the panel 356 may be suitable temperature indicators for the exposure unit 26 and developing unit 29 and an ammonia supply gauge to indicate the amount of usable solution available. The panel also carries a normally closed manually actuated clear switch (not shown) connected in series with the solenoid 345. The clear switch permits de-energization of the solenoid 345 so that cards can again be fed from the files 20 and 21 after a malfunction causing stoppage has been corrected.

Although only one embodiment of the present invention has been illustrated, in the accompanying drawings and described in the foregoing specification, it is to be understood that said invention is not limited to said embodiment or to the particular type of insert and card disclosed, as many changes may be made in the apparatus of the invention, particularly in the design without departing from the spirit and scope of the invention as will now be clear to those skilled in the art.

What is claimed is:

1. In a photoprinting machine having means for storing a set of card-like members each having at least one sensitized portion and for storing a set of original card-like members each having a similarly located original printed portion, the combination comprising, an endless conveyor having a straight line stretch and having means defining a series of member-receiving pockets, an elongated light source disposed adjacent and in alignment with said straight line conveyor stretch, means for inserting a member from each set in superimposed relation into at least one of said pockets, means for driving said conveyor to move said pocket along said light source and expose the members in said pocket to said light source for printing of the member from said first-mentioned set, and means on said conveyor adapted to engage and clamps said superimposed members within said pocket after insertion of said members therein and while said pocket is moved along said light source.

2. In a photoprinting machine having means for storing a set of card-like members each having at least one sensitized portion and a set of original card-like members each having a similarly located original printed portion, the combination comprising an endless conveyor having a straight line stretch and having means defining a series of member-receiving pockets, an elongated light source disposed adjacent and in alignment with said straight line conveyor stretch, means for inserting a member from each set in superimposed relation into at least one of said pockets, means for driving said conveyor to move said pocket along said light source and expose the members in said pocket to said light source for printing of the member from said first-mentioned set, and platen means on said conveyor adapted to retain a pair of said members in said pocket and to press the sensitized portion and the printed portion of said members together while said pocket is moved along said light source.

3. In a photoprinting machine having means for storing a set of card-like members each having at least one photosensitive portion and a set of original card-like members each having a similarly located original printed portion, the combination comprising, an endless conveyor having means defining a series of member-receiving pockets, means for moving said conveyor intermittently along a predetermined straight line stretch, means defining spaced loading and unloading stations adjacent said conveyor and adjacent opposite ends of said straight line stretch, means at said loading station adapted to simultaneously insert a member from each set in superimposed relation into at least one of said pockets, means at said unloading station adapted to simultaneously remove a pair of members from at least one of said pockets, an elongated light source adjacent said conveyor and positioned along said straight line stretch between said loading and unloading stations, and means on the conveyor associated with at least one of said pockets for clamping a pair of said superimposed members in said pocket as said pocket traverses said light source between said loading and unloading stations.

4. In a photographing machine having means for storing a set of card-like members each having at least one sensitized portion and a set of original card-like members each having a similarly located original printed portion, the combination comprising, an endless conveyor having means defining a series of member-receiving pockets, means for moving said conveyor intermittently along a predetermined path which includes a straight line stretch, means defining spaced loading and unloading stations adjacent said conveyor and adjacent opposite ends of said straight line stretch, means at said loading station adapted to simultaneously insert a member from each set in superimposed relation into at least one of said pockets, means at said unloading station adapted to simultaneously remove a pair of members from at least one of said pockets, an elongated light source mounted adjacent the straight line stretch of said conveyor between said loading and unloading stations, said light source including means for emitting and directing toward said pockets and said members only light rays which are substantially normal to said straight line stretch, platen means mounted on each of said pockets for movement between an open and closed position, means biasing said platen means to said closed position in which it is adapted to hold a pair of said superimposed members in said pocket, and means at said loading and unloading stations adapted to move said platen means to said open position.

5. In a photoprinting apparatus for printing a set of duplicate card-like members each having at least one sensitized portion from a set of original card-like members each having a similarly located original printed portion, comprising an endless conveyor having means defining a series of member-receiving pockets, said pockets each comprising an exposure window and a plate-like holding member mounted for movement toward and away from superimposed relation with said exposure window, means biasing said holding member toward said superimposed relation with said exposure window, means for moving said conveyor along a predetermined path which includes a straight line stretch, means defining spaced loading and unloading stations adjacent said conveyor and adjacent opposite ends of said straight line stretch, means at said loading station adapted to move said holding member of at least one of said pockets away from said superimposed relation with said exposure window, means at said loading station adapted to insert a member from each set in superimposed relation into said at least one of said pockets between said exposure window and said holding member thereof, an elongate exposure unit aligned with said straight line stretch to direct substantially parallel rays of radiation toward the exposure window of each said pocket as it is moved therealong, means at said unloading station adapted to move said holding member of at least one of said pockets away from said superimposed relation with said exposure window, and means at said unloading station adapted to remove a pair of members from said last-mentioned at least one of said pockets.

6. In a photoprinting apparatus having means for storing a set of card-like members each having at least one sensitized portion and for storing a set of original card-like members each having a similarly located original printed portion, an endless conveyor having a straight line stretch and having means defining a series of member-receiving pockets, each of said pockets having a flat light permeable portion, means for inserting a member from each set in superimposed relation into at least one of said pockets, a platen means carried by said conveyor, said platen means being adapted to engage and press said members together upon insertion of said members in said pockets, an elongated exposure unit disposed adjacent and in alignment with said straight line conveyor stretch, said exposure unit comprising an elongated chamber having one substantially open side, an elongated lamp positioned within said chamber, means for supporting said lamp, arcuate elongated reflector means associated with said lamp and adapted to direct rays therefrom toward said open side, baffle means positioned transversely to said lamp in said one open side, said baffle means being arranged to limit emission of light through said open side to rays which are substantially normal to the axis of said lamp, and means for driving said conveyor to move said at least one of said pockets past said exposure unit and to thereby expose said members to the rays emitted from said lamp for printing of the member from said first-mentioned set.

7. A photoprinting machine for printing a set of duplicate card-like members each having at least one sensitized film portion from a set of original card-like members each having a similarly located original printed film portion, comprising an endless conveyor having a straight line stretch and having means defining a series of member-receiving exposure pockets, each of said pockets having a flat light permeable portion, means for inserting and aligning a member from each set in superimposed relation into at least one of said pockets with the film portions overlaying said light permeable portion, a plate-like holding member carried by said conveyor, said holding member being adapted to engage and press said members together and against said light permeable portion of said pocket, an elongated exposure unit disposed beneath and in alignment with said straight line conveyor stretch, said exposure unit comprising an elongated chamber having one substantially open side, at least one elongated lamp positioned within said chamber, means for supporting said lamp, arcuate elongated reflector means associated with said lamp and adapted to direct rays therefrom toward said one open side, baffle means positioned transversely to said lamp in said one open side, said baffle means being arranged to limit emission of light through said one open side to rays which are substantially normal to the axis of said lamp, adjustable shutter means positioned adjacent said one open side and defining the effective area thereof, and means for driving said conveyor to move said at least one of said pockets past said exposure unit and to thereby expose said members to the rays emitted from said exposure unit while said members are in superimposed relation.

8. In a photoprinting apparatus having means for storing a set of card-like members each having at least one sensitized portion and for storing a set of original card-like members each having a similarly located original printed portion, the combination comprising an endless conveyor having a straight line stretch and having means defining a series of member-receiving pockets, each of said pockets having a flat, light permeable portion, means carried by said pockets being adapted to engage and press card-like members inserted therein against said light permeable portion; means for inserting a member from each set in superimposed relation into at least one of said pockets; an elongated exposure unit disposed adjacent and in alignment with said straight line conveyor stretch, said exposure unit comprising an elongated lamp extending generally parallel with said straight line conveyor stretch, reflector means associated with said lamp and adapted to direct rays therefrom toward said straight line stretch, and means arranged between said lamp and said straight line conveyor stretch for limiting the radiation emitted from said lamp and directed toward said straight line stretch to rays which are substantially normal to said straight line stretch; and means for driving said conveyor to move said pockets along said exposure unit and to thereby expose said card-like members in said pockets to the radiation for imaging the member from said first mentioned set.

(References on following page)

References Cited by the Examiner

UNITED STATES PATENTS

| | | | |
|---|---|---|---|
| 2,654,300 | 10/53 | Baker | 95—75 |
| 2,812,699 | 11/57 | Bungay | 95—94 |
| 3,022,716 | 2/62 | Smith | 95—77.5 |
| 3,099,199 | 7/63 | Bornemann et al. | 95—73 |

OTHER REFERENCES

Publication: "A High Speed Color Printer," by Gundelfinger, Taylor and Young, published in the Journal of Photographic Science, vol. 8, No. 5, pages 161–170.

EVON C. BLUNK, *Primary Examiner.*

JOHN M. HORAN, *Examiner.*